April 13, 1965  E. C. COTTET  3,178,049
COMPOSITE RECEPTACLES
Filed Jan. 20, 1964
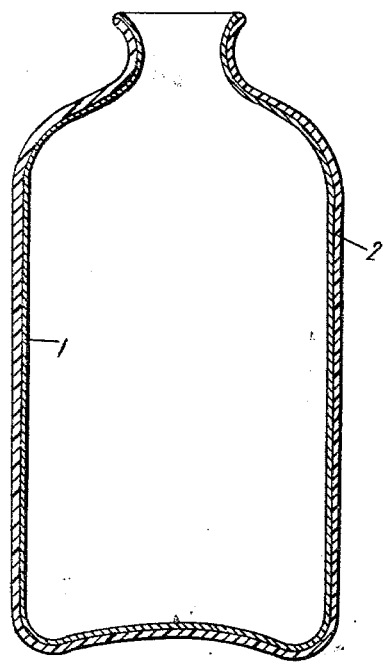
Inventor
Emile Clement Cottet
By Stevens, Davis, Miller & Mosher
Attorney – # United States Patent Office 3,178,049
Patented Apr. 13, 1965

3,178,049
COMPOSITE RECEPTACLES
Emile Clement Cottet, Paris, France, assignor to Rhone-Poulenc S.A., Paris, France, a corporation of France
Filed Jan. 20, 1964, Ser. No. 338,809
Claims priority, application France, Jan. 25, 1963, 922,665
3 Claims. (Cl. 215—1)

This invention relates to light composite receptacles.

The lightening of packs is still a very important problem which engages the attention of both manufacturers and transport undertakings. Light, and sometimes transparent, receptacles of plastic materials have heretofore been produced, but it has been observed that such materials have an appreciable permeability to gases, more especially air, as well as to liquids and vapours, more especially water and vapour.

The penetration of air or water vapour to the inside of a receptacle may impair its contents, while, when the latter comprise water or another volatile liquid the loss of vapour through the walls may lead to drying of the contents.

Thick glass bottles (designed to contain fluids under pressure) have been produced, which have been lined with a plastic coating capable of limiting the effects of accidental explosion of the bottle.

It has also been proposed to decorate ordinary glass bottles of standard types by coating them with various plastic materials.

The present invention provides new light composite receptacles of glass having a wall thickness of 0.15 to 0.70 mm. surrounded on the outside by a contiguous outer envelope of a thermoplastic material having a wall thickness at least equal to that of the glass, and ordinarily of 0.2 to 0.9 mm. It is obvious that receptacles made of such thin glass alone could not withstand the usual manipulations without damage, but it has now been observed that if they are coated with a plastic, or even flexible, material they are given a robustness which fits them for normal conditions of handling and use. This is the more unexpected since the flexible coating in itself has only a low resistance to deformation. The composite receptacles of the invention are obtained by coating the inner envelope of thin glass with the thermoplastic material.

The inner envelopes of thin glass can either be known receptacles of thin glass, such as ampoules, or receptacles of thin glass specially made and they will ordinarily have the same shape as similar glass vessels of normal thickness. Although the invention is applicable to all thin glass vessels of ordinary dimensions, it is especially applicable to vessels having a capacity of 10 to 1000 cc. Such vessels can be manufactured by any appropriate glass working technique, such as blowing or moulding.

The thermoplastic material used for forming the outer envelope may be, for example, a polyvinyl ester such as polyvinyl chloride or acetate or their copolymers, a cellulose ester such as cellulose acetate, butyrate, or propionate or their mixtures, a polyamide, a polyester, a polyurethane, a polyether, which may be chlorinated, or a polyolefin especially polyethylene. Polyvinyl acetate and its mixtures with acrylic elastomers, e.g. that based on ethyl methacrylate, styrene and butadiene, and plasticized cellulose acetate are preferred.

The application of the thermoplastic material can also be carried out by any suitable known method: for example, (a) By spraying the thermoplastic material as a powder, optionally by an electrostatic spraying method, onto the hot external surface of the inner envelope, optionally coated with a thin layer of an adhesive material;

(b) By dipping the inner envelope, maintained at an appropriate temperature, and optionally coated with a layer of adhesive, into a stationary fluidized bed of the plastic material in powder form; or (c) By dipping the inner envelope, if desired while hot, into a molten bath of the plastic material or into a solution or a dispersion of such material.

It is obvious from the above described spraying or dipping methods that the resultant plastic layer comprises a coating in the nature of a solid film.

It is, of course, possible to modify the properties of the plastic outer envelope by treatments which improve, for example, its hardness, the slipperiness of its surface, or its resistance to various external agents, using methods known in the plastics industry, e.g. chemical or radiochemical grafting of appropriate monomers, or treatment with anti-adhesion agents. It is also possible to modify the appearance of the outer envelope, either before or after the additional treatments just mentioned, by, for example, printing, dyeing, or metallization, which can readily be applied to the plastic material.

The following examples illustrate the invention.

Example 1

A 125-cc. bottle of thin glass (wall thickness 0.15 to 0.20 mm.) is heated to about 300° C. and covered, by electrostatic spraying, with a 0.6 mm. layer of polyvinyl acetate (Rhodopas H, of the Societe des Usines Chimiques Rhone-Poulenc). The polyvinyl acetate powder is composed of grains having a diameter of 0.20 to 0.22 mm., which become fixed by fusion to the external walls of the bottle. The latter is then placed in an annealing oven, maintained at about 220°–250° C., in which the coating becomes smooth.

After cooling, there is obtained a light, completely transparent bottle which is sufficiently robust to resist a fall of 1 metre.

Example 2

A 400-cc. glass bottle having walls of 0.4 to 0.5 mm. is heated to 300° C. and plunged while hot into a stationary fluidized bath of a powder having a grain size between 100 and 150μ and having a composition comprising 80% of Rhodopas H and 20% of Acryloid (an elastomeric copolymer based on ethyl methacrylate, styrene, and butadiene in the proportions 55:10:35). The external wall of the bottle becomes covered with a molten layer of the composition which, after annealing in an oven at 250° C., forms on its surface a continuous coating 0.6 mm. thick. A solid composite bottle is obtained which is capable of withstanding, while full of powder or liquid, any of the usual manipulations without danger of breakage.

Example 3

A 400-cc. glass bottle of the kind used in Example 2 is heated to about 150° C. and dipped into a bath, maintained at 170° C., of a fused composition based upon plasticized cellulose acetate, known under the trade mark "Parochoc." The bottle is then withdrawn from the bath and allowed to cool. A very light composite bottle covered with a shock-resistant plastic film of a thickness of 0.6 to 0.7 mm. is thus obtained. A composite receptacle in accordance with the invention is shown in the accompanying drawing which shows an inner envelope 1 of glass 0.15 to 0.20 mm. thick surrounded by a contiguous outer envelope 2 of polyvinylacetate 0.6 mm. thick.

I claim:

1. Light composite receptacles having a capacity of 10 to 1000 cc. comprising an inner envelope of glass having a wall thickness of 0.15 to 0.70 mm. coated on the outside by a contiguous outer envelope of a solid thermoplastic material having a wall thickness which is at least equal to that of the glass and is 0.2 to 0.9 mm.

2. Receptacles as claimed in claim 1 in which the thermoplastic material is selected from the class consisting of vinyl and acrylic polymers and cellulose esters.

3. Receptacles as claimed in claim 2 in which the thermoplastic material is selected from the class consisting of polyvinyl acetate mixtures thereof with an acrylic elastomer, and plasticized cellulose acetate.

References Cited by the Examiner
UNITED STATES PATENTS

| | | | |
|---|---|---|---|
| 739,514 | 9/03 | Street | 215—1.5 |
| 3,007,594 | 11/61 | Wallace | 215—1.5 |

FRANKLIN T. GARRETT, *Primary Examiner.*